Sept. 8, 1959  W. G. TOLAND  2,903,480
OXIDATION PROCESS WITH SULFUR AND WATER
Filed March 16, 1956
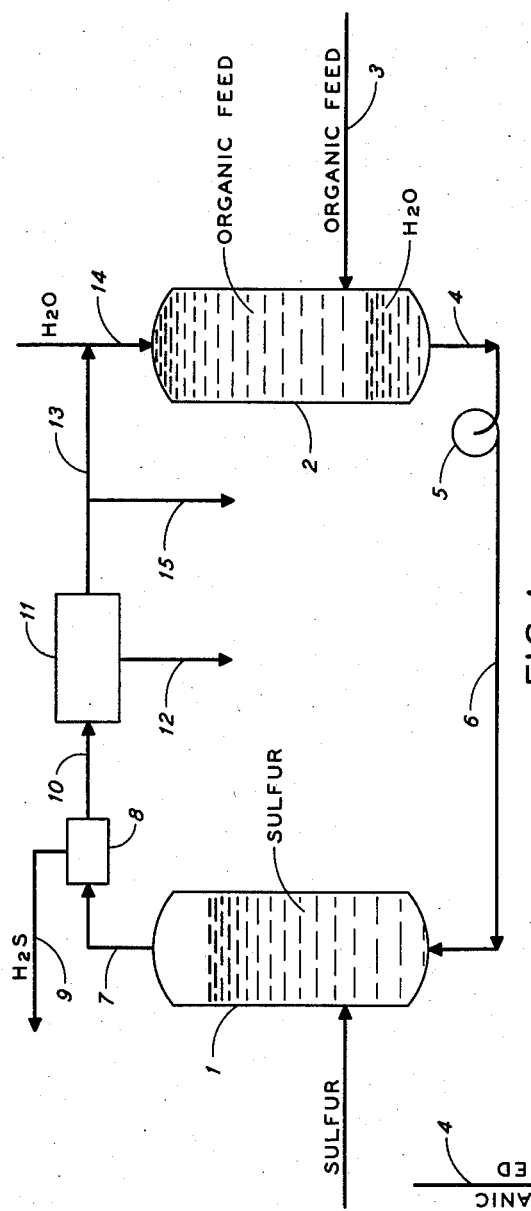
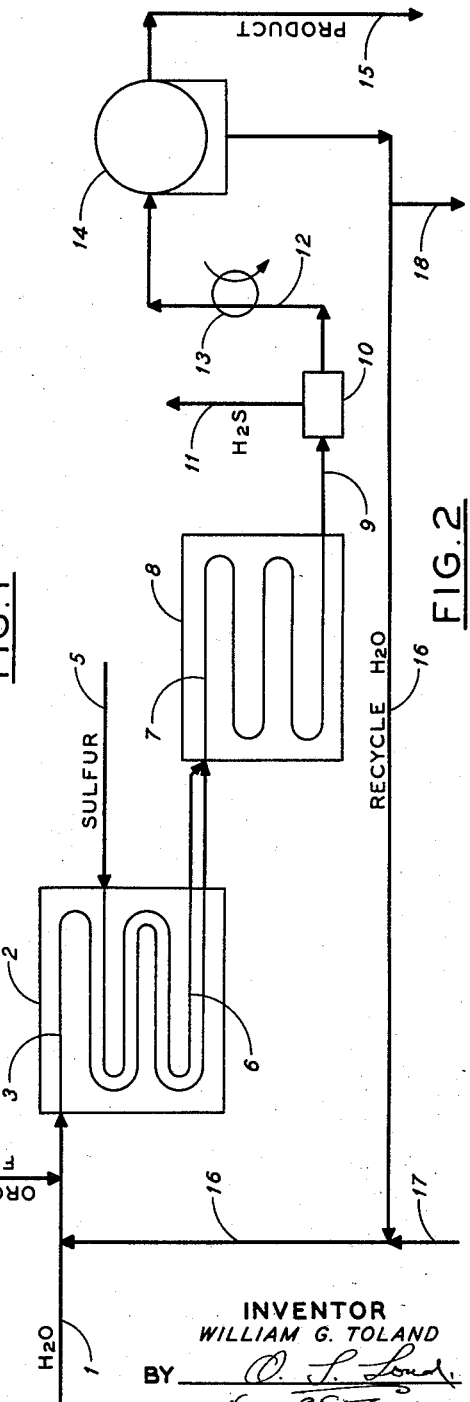
INVENTOR
WILLIAM G. TOLAND
BY
ATTORNEYS

United States Patent Office 2,903,480
Patented Sept. 8, 1959

---

2,903,480

OXIDATION PROCESS WITH SULFUR AND WATER

William G. Toland, San Rafael, Calif., assignor to California Research Corporation, San Francisco, Calif., a corporation of Delaware Application March 16, 1956, Serial No. 572,059

10 Claims. (Cl. 260—523)

This invention relates to a process for oxidizing organic compounds. More particularly, it relates to a process for oxidizing organic compounds in which the effective oxidizing agent is elemental sulfur.

Pursuant to the invention, an organic compound, elemental sulfur and water are intimately contacted with each other at a temperature above about 500° F. and in the range from about 500° F. to about 1000° F. The reactants may be in liquid phase, vapor phase or mixed liquid and vapor phase during the contact.

In a preferred embodiment of the invention the oxidation reaction is conducted at 500°–700° F. under a superatmospheric pressure sufficient to maintain a part of the water in liquid phase and the mol ratio of water to organic compound charged to the reaction zone is at least 20 to 1.

Pursuant to a particularly efficient embodiment of the invention, the water and organic compound are heated to reaction temperature, preferably to a temperature in the range from 500°–700° F. before they are contacted with elemental sulfur, and the reaction is conducted at a superatmospheric pressure sufficient to maintain a part of the water in liquid phase.

The process of the invention is illustrated by the following examples:

EXAMPLE 1

A 4.5-liter, stainless steel autoclave was charged with 92 grams of toluene and 1800 cc. of water. One hundred grams of sulfur was placed in an over-sized glass test tube arranged so that when the autoclave was first shaken, the contents would mix with the tube contents. The autoclave was sealed and heated to 625° F. before shaking. Shaking at temperature was continued for 90 minutes, and the pressure rose to 2250 p.s.i.g. The autoclave was cooled and 70 grams of hydrogen sulfide bled into a caustic scrubber. The products were filtered and dried; and the solid cake, which was a mixture of benzoic acid, sulfur, and by-products, was distilled. There was obtained 79.9 grams of benzoic acid, neutral equivalent 124.4, as an overhead cut. An additional 5 grams was recovered as column holdup. In the aqueous filtrate, 6.8 grams of benzoic acid was found. Distillation bottoms, 20.6 grams, contained sulfur and other dark by-products. The yield of benzoic acid was 75.2% of theory.

EXAMPLE 2

A 4.5-liter autoclave was charged with 53 grams of meta-xylene (95% purity) and 1800 cc. of water. One hundred grams of sulfur was placed in an over-sized test tube and covered with 300 cc. of water to prevent contact between xylene vapors and sulfur during the heating up of the autoclave. Again the test tube was so arranged within the autoclave that when shaking was commenced, the contents of the tube and autoclave would mix. The autoclave was sealed and heated to 625° F. before shaking. The autoclave was then shaken at 625° F. for 45 minutes, during which time the pressure rose to 2300–2500 p.s.i.g. The autoclave was cooled and depressured. Seventy grams of hydrogen sulfide was recovered from the gas released on depressuring. The products were worked up by dissolving in caustic to a pH of 7, filtering to remove unreacted sulfur, acidifying to pH 1 to precipitate organic acids, filtering, washing and drying the cake. This yielded 67.1 grams of an off-white cake, neutral equivalent 90.5, which contained a mixture of meta-toluic and isophthalic acids. This product contained 21.6 mol percent of a theoretically possible yield of meta-toluic acid and 64 mol percent of a theoretically possible yield of isophthalic acid.

EXAMPLE 3

A 4.5-liter autoclave was charged with 1800 cc. of water and 100 grams of sulfur thoroughly wetted so it would remain below the water. The autoclave was sealed and 42 grams of propylene added under pressure. It was then heated to 600° F. before shaking. Shaking was continued for two hours at temperature. The pressure rose and became constant at 2150 p.s.i.g. after 40 minutes. Upon cooling and bleeding of gases, there was obtained 90 grams of hydrogen sulfide and 0.5 cubic foot of non-acidic gases. The reaction products were worked up to obtain 11.9 grams of black, carbonaceous material, 6.5 grams of crude sulfur, 7.0 grams of propionic acid, neutral equivalent 75.5, and 6.2 grams of crude acetic-propionic acids, neutral equivalent 185. Titration of the original reaction products indicated the presence of 0.207 mol of organic acids, not all of which were isolated by the extraction procedure utilized.

EXAMPLE 4

A 4.5-liter autoclave was charged with 53 grams of ortho-xylene (95% purity), 1700 cc. of water, and in an over-sized glass test tube 150 grams of sulfur covered with 100 cc. of water. The autoclave was sealed and heated to 625° F., where shaking was begun and was continued for two hours. The pressure rose to a constant level of 2325 p.s.i.g. in about 70 minutes. Upon cooling, 80 grams of hydrogen sulfide was bled from the autoclave. From the products, there was isolated 66.4 grams of crude sulfur, insoluble in water; 7.9 grams of ortho-toluic acid, neutral equivalent 132.2, extracted from the water; 34.1 grams of orthophthalic acid containing some ortho-toluic acid, neutral equivalent 92.7, by crystallization from the water, and 8.2 grams of additional ortho-phthalic acid plus inert materials, neutral equivalent 119.7, by evaporation of the water. This represents a yield of ortho-toluic acid of 24.4% of theory and of ortho-phthalic acids of 37.5% of theory, for a total of 61.9% yield of theory of aromatic acids.

EXAMPLE 5

A 4.5-liter autoclave was charged with 53 grams of para-xylene (95% purity), 1700 cc. of water, and in a separate glass tube 150 grams of sulfur covered with 100 cc. of water. The autoclave was sealed and heated to 625° F. where it was shaken for two hours. The pressure rose to 2225 p.s.i.g. after 35 minutes and held constant. When cold, the bomb was bled to obtain 80 grams of hydrogen sulfide. Workup of the products yielded 151.1 grams of solids, of which 68.8 grams consisted of crude sulfur, 37.0 grams consisted of cream-colored solids, neutral equivalent 90.1 (a mixture of terephthalic and para-toluic acids) and 19.8 grams of white solids, neutral equivalent 81.3, relatively pure terephthalic acid. The over-all yield of para-toluic acid was 11% of theory and of terephthalic acid, 59.4% of theory, for a total of 70.4% of theory of aromatic acids.

EXAMPLE 6

A 4.5-liter autoclave was charged with 68 grams of para-toluic acid, 1800 cc. water, and 64 grams of sulfur in the over-sized test tube described previously. The autoclave was sealed and heated to 600° F. before shaking for 90 minutes, during which the pressure rose to 1750 p.s.i.g. After cooling, 30 grams of hydrogen sulfide was bled from the autoclave. Products were removed, digested in caustic to separate water-soluble toluic and terephthalic acid salts from sulfur, the pH adjusted to about 7 with hydrochloric acid, and a total of 9.5 grams of sulfur removed by filtration. The filtrate was carbon treated and then acidified to about pH 1 to precipitate aromatic acids. These were filtered, washed, and dried to give 70.7 grams of a mixture of para-toluic and terephthalic acids, which was found to contain 8.2 grams para-toluic and 62.5 grams terephthalic acids. Another 4.0 grams para-toluic acid remained in the filtrates. There was an 82% conversion of para-toluic acid to give a 92% yield of theory of terephthalic acid.

EXAMPLE 7

A 4.5-liter autoclave was charged with 150 grams of sulfur, 1800 cc. of water, and 44 grams of propane. The sulfur was added so it would remain at the bottom of the autoclave, and the propane was introduced without agitation so it remained above the water. The autoclave was sealed and heated to 625° F., where it was shaken for two hours. The pressure rose to 2675 p.s.i.g. and was still slowly rising at the end of two hours. When cold, the bomb was bled of gases. The liquid products, when titrated, showed the presence of 0.325 mol of organic acids. Crude sulfur, 24.3 grams, was obtained, and by chloroform extraction and by distillation there was obtained 6.5 grams of an overhead fraction, boiling point 110–122° C., neutral equivalent 73.0, and 5.1 grams of bottoms, neutral equivalent 65.9. Both of these fractions consisted of a mixture of acetic and propionic acids.

EXAMPLE 8

A 4.5-liter autoclave was charged with 1800 cc. of water, 112 grams of diisobutylene, and 150 grams of sulfur, so arranged that the sulfur remained on the bottom and the hydrocarbon on the top of the water until shaking was begun. The autoclave was sealed and heated to 550° F. before shaking for two hours. The pressure rose to 1750 p.s.i.g., where it held constant after about one hour. When cold, the bomb was bled to recover 150 grams of hydrogen sulfide in a caustic scrubber. Titration of the products indicated a 21.3% yield of organic acids.

EXAMPLE 9

A 2.5-liter autoclave was charged with 900 cc. of water and 60 grams of acetophenone. One hundred grams of lump sulfur was suspended in a beaker from the thermo-well in such a way as to remain below the surface of the water until the autoclave was rocked. The autoclave was sealed and heated to 625° F. before shaking. At this temperature the pressure had reached 1875 p.s.i.g. and shaking was begun. After 30 minutes the pressure became constant at 2375 p.s.i.g., but shaking was continued at temperature for a total of one hour. After cooling, the autoclave was depressured through a caustic scrubber which collected 60 grams of a mixture of $H_2S$ and $CO_2$. The products remaining in the autoclave were then transferred to a solution of 20 grams of sodium hydroxide in 100 cc. of water. The mixture was digested for 30 minutes and the pH then adjusted to 7 by the addition of hydrochloric acid. The solution was decanted from a lump of black solid with the odor of organic sulfur compounds. This material weighed 64.3 grams. The decanted solution was filtered cold to give a 7.6-gram cake of crude sulfur. The filtrate was acidified to about pH 2 with hydrochloric acid to precipitate insoluble aromatic acids. The resultant slurry was filtered cold to give a cake which, when washed and dried, weighed 22.5 grams and had a neutral equivalent of 121.2. This material was benzoic acid. From a total of 1420 cc. of filtrates and washes, there was found an additional 2.5 grams of benzoic acid, for a total of 25 grams. This represents a 41% yield of theory.

Further exploration of the applicability of the process of the invention to the oxidation of a variety of organic compounds indicates that the method is effective to oxidize any organic compound containing at least one carbon to hydrogen bond. Materials such as alkyl substituted aromatic hydrocarbons, e.g., toluene, xylenes, cumene, cymenes, etc., alcohols, ketones, aldehydes, esters, olefins, and alkyl benzoic acids such as toluic acids, are especially adaptable to oxidation pursuant to the invention. The following table indicates the manner in which the process of the invention may be applied to the oxidation of a variety of organic materials:

Table

| Organic Compound | Products |
| --- | --- |
| Saturated Hydrocarbons: | |
| Methane | $CO_2$. |
| Propane | acetic, propionic acids. |
| Isooctane | mixed aliphatic acids. |
| Cyclohexane | phenol, benzene. |
| Toluene | benzoic acid. |
| α-methylnaphthalene | α-naphthoic acid. |
| Olefins: | |
| Propylene | acetic, propionic acids. |
| Diisobutylene | mixed aliphatic acids to $C_8$. |
| Styrene | benzoic and phenylacetic acids. |
| α-methylstyrene | α-phenylpropionic acid. |
| Cyclopentene | carbon, tar. |
| Oxygenated Compounds: | |
| Ethanol | acetic acid. |
| Acetone | propionic acid. |
| Acetophenone | benzoic acid. |
| p-toluic acid | terephthalic acid. |
| Tetrahydrofuran | acetic, propionic, succinic acids. |
| Sulfur Compounds: | |
| Propyl mercaptan | acetic, propionic acids. |
| Diethyl sulfide | acetic acid. |
| Thiophane | $C_1$–$C_4$ aliphatic acids, succinic acid. |
| Nitrogen Compounds: | |
| Triethylamine | acetic acid. |
| Pyrrole | $C_1$–$C_4$ aliphatic acids, succinic acid. |

The nature of the reaction occurring in the process is represented by the following equations illustrating the course during the oxidation of several organic materials:

$$\phi CH_3 + 3S + 2H_2O \rightarrow \phi COOH + 3H_2S$$

$$\phi(CH_3)_2 + 6S + 4H_2O \rightarrow \phi(COOH)_2 + 6H_2S$$

$$C_2H_5OH + 2S + H_2O \rightarrow CH_3COOH + 2H_2S$$

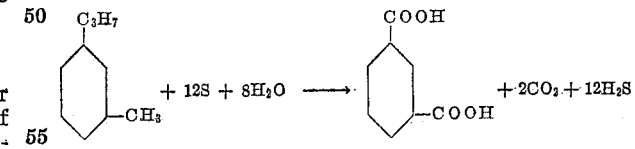

As noted hereinbefore, the reaction is conducted at temperatures in the range 500 to about 1000° F. Irrespective of temperature, the reaction is desirably conducted at an elevated pressure in the range about 500 p.s.i.g. to about 3500 p.s.i.g. While lower pressures are operative, rates of reaction and space rates are low. In preferred operation pursuant to the invention, the temperature is in the range 500 to 700° F. and the pressure is in the range 1500–3500 p.s.i.g.

The ratio of sulfur to organic material charged to the reaction zone may vary over a considerable range, generally from .5 to 20 gram atoms of sulfur per mol of organic material. If the quantity of sulfur charged to the reaction zone is less than that stoichiometrically required for complete oxidation of the organic material pursuant to the reaction, partial conversion will occur and the unconverted organic material may be recycled to the reaction zone. An excess of sulfur over the amount stoichiometrically required for the particular reaction does no serious harm and may be retained in the reaction zone for subsequent contact with further quantities of the organic material and water.

From the equations it will be noted that water is a reactant and that the stoichiometry of each of the reactions requires the presence of some minimum amount of water if complete conversion of the organic material is to be accomplished. It has been found, however, that the mol ratio of water to organic material charged to the reaction zone must be very much greater than the stoichiometric ratio. In the process, water has two essential functions: first, it functions as a reactant, and, second, it functions as a necessary diluent. It is known that at temperatures in the range employed in the present process, sulfur reacts directly with a variety of organic materials, including hydrocarbons, to produce various sulfur compounds and heavy sulfur-containing tarry and polymeric materials.

In the process of the present invention it is important to minimize direct contact between the organic material and sulfur in the absence of an excess of water at reaction temperature in order to obtain acceptable yields of desired products. Such direct contact may be reduced by charging at least 20 mols of water per mol of organic material to the reaction zone. It may be further reduced by introducing sulfur into the reaction zone at a rate such that no appreciable content of unreacted sulfur is permitted to build up in the reaction zone during the course of the reaction. Direct reaction between sulfur and the organic compound without participation of the water reactant may be most effectively minimized by introducing the organic compound and water into the reaction zone in proportions such that the organic material is substantially completely dissolved in water at reaction temperature and the mol ratio of water to organic material is in excess of 20:1, irrespective of the water solubility of the organic material, heating the water and organic material to reaction temperature, and then bringing the hot mixture or solution into contact with the elemental sulfur. The greater efficiency of the latter method is illustrated by contrasting Example 5, above, with the following Example 10.

EXAMPLE 10

A 4.5-liter, stainless steel autoclave was charged with 212 grams of para-xylene, 1800 cc. of water, and 200 grams of sulfur. The autoclave was sealed, heated, and shaken at 600° F. for 90 minutes. The pressure rose to 700 p.s.i.g. before plugging the gage. When cold, the autoclave was bled to recover 120 grams of hydrogen sulfide. The products were dissolved in caustic and filtered to give 122.6 grams of black, carbonaceous material. The pH of the filtrate was adjusted to 7 to precipitate sulfur. When filtered, this gave a 25.4-gram cake of crude sulfur. The filtrate was acidified to pH 1 to precipitate organic acids. These were filtered, washed, and dried to give 69.5 grams of a white cake, neutral equivalent 123.2, which was a mixture of para-toluic and terephthalic acids. Extraction with xylene permitted a partial separation of these acids, from which it was calculated that a 24.8 weight percent yield of para-toluic acid was obtained and a 7.9 weight percent yield of terephthalic acid, a total of 32.7 weight percent of aromatic acids.

The contrasting yields obtained in Examples 5 and 10 illustrate the advantage obtained when the process is carried out by bringing an aqueous solution of the organic material to be oxidized to reaction temperature before permitting contact of elemental sulfur with the other reactants.

Instead of insuring participation of water by using an aqueous solution of the organic compound, a mixture of these vapors can be exposed to the sulfur, as indicated in the following Example 11. This is most effective when the product acids are volatile enough to be recovered from the reaction zone as vapor also.

EXAMPLE 11

Eighty-five grams of sulfur was sealed in a glass ampule with a stainless steel slug to serve as a weight to crush the ampule at the desired time. The ampule was charged to a 4.5-liter autoclave with 79 grams of toluene and 310 cc. of water. The toluene and water were of such quantity as to become completely vaporized in the reactor at reaction temperature and pressure. The autoclave was sealed and heated to 650° F., where shaking was begun. The shaking served to shift the weight in the sealed ampule, causing it to break and permitting the vapors of toluene and water to contact the molten sulfur. The initial pressure at 650° F. was 1475 pounds. In the first 4 minutes, the temperature dropped to 616° F., and the pressure rose to 1625 pounds. At the end of 25 minutes, pressure had become constant at 1900 pounds at a temperature of 648° F. Shaking was continued for a total of 2 hours, during the last 10 minutes of which the hot vapors were bled from the autoclave into 2 liters of water. Hydrogen sulfide passed on through the water into a caustic scrubber. The water and condensate consisted of a light yellow cloudy water phase, some yellow solids, and a thin film of insoluble organic liquid on the surface. These products were steam stripped to remove the residual hydrogen sulfide and volatile organic material. This organic material was found to consist of 16.5 cc. of unreacted toluene. The stripper bottoms which were at pH 3 were digested with 20 grams of caustic, then adjusted to pH 7 with aqueous hydrochloric acid to precipitate sulfur. By filtration, 4.9 grams of sulfur was removed. The filtrate was treated with 2 grams of active carbon, filtered, and the filtrate acidified to pH 1–2 with hydrochloric acid. The resultant thin slurry was extracted with chloroform using two 150 cc. portions. Upon evaporation of the chloroform there remained 3.9 grams of crude benzoic acid with a neutral equivalent of 127.

The residue remaining in the bottom after cooling was digested with 40 grams of caustic and 600 cc. of water, acidified to pH 7 with hydrochloric acid, filtered to remove 52 grams of crude sulfur and by-products, and the filtrate acidified to pH 1 to precipitate an additional 11.3 grams of crude benzoic acid, neutral equivalent 132. This represents a total yield of 17.5% of theory of benzoic acid.

The following Example 12 illustrates the operability of the process of the invention when the oxidation is conducted at temperatures such that all organic compound and water and most of the sulfur are in vapor phase.

EXAMPLE 12

A 4.5-liter autoclave was charged with 310 cc. of water and 40 g. of toluene. There was then introduced a sealed glass ampule containing 43 g. of sulfur and a stainless steel slug to serve as a weight to crush the sample at the desired time. The autoclave was sealed and heated to 790–800° F., where shaking was begun. The shaking served to shift the weight in the sealed ampule, causing it to break and permitting the vapors of toluene and water to contact the molten sulfur. Reaction temperature in this instance is above the critical temperature of both water and toluene. The initial pressure was 2375 p.s.i. at 790° F. Within 20 minutes the pressure leveled out at 2500 p.s.i. Shaking was continued for a total of 30 minutes, after which the bomb was cooled to 600° F. and all vapors bled from the bomb into water. This gave a cloudy water phase containing yellow solids with some organic liquid on the surface. The water and condensate from the hot bleed operation was steam stripped at atmospheric pressure until all volatile organic liquid was removed. From the overhead condensate there was obtained an organic phase which was extracted with dilute aqueous caustic to remove any acidic constituents and then filtered, dried, and distilled. This proved to be a mixture of benzene and toluene in the ratio of about 1:1. The bottoms from the steam strip operation were digested with 20 g. of sodium hydroxide in aqueous solution to dissolve organic acids as their sodium salt. The pH of this solution was then adjusted to 7 with hydrochloric acid and filtered to remove a brown cake, containing crude sulfur. The filtrate was acidified to pH 1 with hydrochloric acid and extracted with chloroform to remove any liberated benzoic acid. Upon evaporation of the chloroform there remained slightly yellow crystals of crude benzoic acid with a neutral equivalent of 130.

The nonvolatile residue in the autoclave was removed after cooling to room temperature. It was found to consist of crude sulfur.

It appeared that the reaction time at this temperature was overly long and that appreciable destruction of benzoic acid by decarboxylation to benzene and some subsequent further oxidation of benzene to $CO_2$ and hydrogen sulfide occurred.

The process may be carried out batchwise, as illustrated in the foregoing examples, or continuously in the manner illustrated in the appended drawings, in which Figure 1 is a diagrammatic illustration of apparatus and process flow for conducting the process in continuous manner, and in which Figure 2 is a diagrammatic illustration of apparatus and process flow suitable for conducting the oxidation in a continuous tubular reactor.

Referring now to Figure 1, vessel 1 is the oxidation zone. It is a cylindrical container nearly filled with molten sulfur which is maintained at a temperature in the range from 500° to 700° F. Vessel 2 is the feed preparation zone. It also is a cylindrical vessel nearly filled with organic feed and maintained at a temperature in the range from 500° to 700° F. Make-up organic feed is introduced into vessel 2 through line 3. The mode of operation illustrated in Figure 1 is especially adapted to the oxidizing of organic materials which are lighter than water and which are generally considered insoluble in water at room temperature and atmospheric pressure. Water falls through the column of organic material in vessel 2, becoming saturated with the organic material as it contacts the column of organic feed countercurrently. The solution of the organic compound in water is withdrawn from vessel 2 through line 4 and pumped by pump 5 through line 6 into vessel 1 where the oxidation reaction occurs. Water and the oxidation reaction products rise through the column of molten sulfur vessel 1 and flow through line 7 into gas liquid separator 8 where hydrogen sulfide is bled from the reaction product mixture through line 9 as the mixture is depressured. The solution or slurry obtained in gas liquid separator 8 is passed through line 10 into separation zone 11 where the reaction product is separated from water and withdrawn through line 12. The water is passed from separation zone 11 through line 13 into line 14 through which it is returned to feed preparation zone 2 together with make-up water. A portion of the water effluent from separation zone 11 may be withdrawn from the system through line 15. Separation may be made by cooling and filtering the reaction product from the water or by extracting the organic product from the water with an organic solvent.

Referring now to Figure 2, water is passed through line 1 into furnace 2 where it circulates through coil 3 and is brought to reaction temperature. The organic feed is passed through line 4 into line 1 where it mixes with the water and flows with the water through coil 3 of the furnace. Sulfur is passed through line 5 into coil 6 of furnace 2 and is there heated to reaction temperature. When both the sulfur and the water-organic mixture have been brought to reaction temperature, they are passed into coil 7 in reactor 8. Coil 7 acts as the oxidation zone. During the passage of the mixture of water, organic compound, and elemental sulfur through coil 7, the desired oxidation occurs. The effluent from reactor 8 is passed through line 9 into gas-liquid separation zone 10 from which hydrogen sulfide is bled through line 11. The resultant depressured solution or slurry is withdrawn from zone 10 through line 12, cooled by heat exchanger 13 to crystallize organic acids in the case, for example, when the organic feed is a xylene. The cooled slurry is filtered at filter 14 to separate a solid product which is withdrawn through line 15 and an aqueous filtrate which is recycled to line 1 through line 16. Make-up water may be added through line 17. A portion of the filtrate may be withdrawn from the system through line 18.

I claim:

1. A process for oxidizing organic compounds which comprises reacting an organic compound having at least one carbon-to-hydrogen bond, water, and elemental sulfur in the absence of a basic material at an elevated temperature in the range of about 500° to 1000° F., said reaction being effected by heating said organic compound with a large molar excess of water prior to any appreciable reaction with said elemental sulfur, and thereby cleaving at least one carbon-to-hydrogen bond and producing oxidized products of said organic compound.

2. A process for producing organic acids which comprises heating, in the absence of a basic material, a solution of an organic compound having at least one carbon-to-hydrogen bond in a large molar excess of water to an elevated temperature in the range from about 500° to 700° F. under a superatmospheric pressure sufficient to maintain water in liquid phase and then intimately contacting in the absence of a basic material the hot solution with elemental sulfur and thereby cleaving at least one carbon-to-hydrogen bond of said organic compound.

3. A process for producing organic acids which comprises heating, in the absence of a basic material, water and an organic compound having at least one carbon-to-hydrogen bond to a temperature above about 500° F. under a superatmospheric pressure sufficient to maintain a substantial proportion of the water in liquid phase and then contacting, in the absence of a basic material, the hot mixture with elemental sulfur and thereby cleaving at least one carbon-to-hydrogen bond of said organic compound, the proportions of water and organic compound being such that the organic compound is substantially completely in solution in water when the mixture of water and organic compound is contacted with sulfur.

4. A process for oxidizing an organic compound having at least one carbon-to-hydrogen bond, which comprises reacting said organic compound in the absence of a basic material with elemental sulfur and water at an elevated temperature in the range from about 500° to 1000° F., and thereby cleaving at least one carbon-to-hydrogen bond and producing oxidized products of said organic compound.

5. A process as in claim 4, wherein yields of said oxidized products are improved by preventing substantially all direct reaction between said organic compound and sulfur both in the absence of water and at temperatures below about 500° to 1000° F.

6. A process as in claim 5, wherein said direct reaction is prevented by heating said water and said organic compound to about 500° to 1000° F. prior to the addition of said sulfur, and then adding said sulfur.

7. A process as in claim 5, wherein said direct reaction is prevented by charging at least 20 mols of water per mol of said organic compound to the reaction zone.

8. A process as in claim 5, wherein said direct reaction is prevented by introducing said sulfur into the reaction zone at a rate such that no appreciable content of unreacted sulfur is permitted to build up in said reaction zone during the course of the reaction.

9. A process as in claim 5, wherein said direct reaction is prevented by introducing said organic compound and water into the reaction zone in such proportions that said organic compound is substantially completely dissolved in water at reaction temperature, and the mol ratio of water to organic material is in excess of 20:1, and said water and said organic compound are heated to reaction temperature prior to addition of said sulfur, and said sulfur is then added to said water and said organic compound.

10. A process as in claim 5, wherein said direct reaction is prevented by heating said organic compound, said water and said sulfur together to reaction temperature so rapidly that said direct reaction is minimized.

References Cited in the file of this patent

UNITED STATES PATENTS

| | | |
|---|---|---|
| 2,587,666 | Toland | Mar. 4, 1952 |
| 2,695,312 | Toland | Nov. 23, 1954 |
| 2,695,313 | Toland | Nov. 23, 1954 |
| 2,722,548 | Aroyan | Nov. 1, 1955 |